United States Patent [19]
Gaut

[11] 3,902,523
[45] Sept. 2, 1975

[54] SAFETY VALVE FOR FLUID CONDUITS

[76] Inventor: Robert T. Gaut, 2730 N.W. 31 St., Oklahoma City, Okla. 73112

[22] Filed: July 12, 1974

[21] Appl. No.: 488,034

[52] U.S. Cl. ............. 137/498; 137/486; 166/224 A
[51] Int. Cl.² ......................................... F16K 31/12
[58] Field of Search ............ 137/486, 498; 166/224, 166/224 A

[56] References Cited
UNITED STATES PATENTS

| | | | |
|---|---|---|---|
| 3,612,081 | 10/1971 | Williams | 137/498 |
| 3,765,443 | 10/1973 | Young | 166/224 |
| 3,768,506 | 10/1973 | McGill | 137/498 X |
| 3,794,069 | 2/1974 | Gulick | 137/486 |
| 3,799,269 | 3/1974 | Brown | 166/224 A |
| 3,802,504 | 4/1974 | Garrett | 166/224 A |

*Primary Examiner*—Harold W. Weakley
*Attorney, Agent, or Firm*—Robert M. Hessin

[57] ABSTRACT

A self-contained safety valve for insertion in a fluid conduit to effect positive flow stoppage upon sensing of greater than predetermined pressure differential within the conduit. The device consists of an elongated structure, a baffle member sized to establish the desired ratio of such predetermined pressure differential to rate of flow, a two-stage piston means responsive to predetermined pressure differential to move into driving engagement with latch releasing mechanism and axially movable flow cutoff valve.

10 Claims, 14 Drawing Figures

SAFETY VALVE FOR FLUID CONDUITS

BACKGROUND OF THE INVENTION

1. Field of the Invention

The invention relates generally to safety valves for fluid conduits and, more particularly, but not only by way of limitation, it relates to improved differential pressure responsive safety valves for use in preventing excess or uncontrolled flow of gases, petroleum fluids and the like within flow conduits.

2. Description of the Prior Art

The prior art includes various types of safety valves, many of which have been in use for a long number of years, which serve the purpose of providing safety cut-off of fluids, liquid or gas, flowing within well casing, pipelines and such. The prior self-contained devices have generally been designed for response to either differential pressure or a minimum pressure limit. The differential pressure devices are usually restricted to what may be termed high energy well applications where very large pressure drops—energy loss—are required for their operation. Also, such devices are subject to premature closure resulting from any rapid change of flow rate. The minimum pressure limit devices are usually restricted to what may be termed low deliverability well applications as normally encountered in oil well and gas well technology.

Prior externally or remote controlled devices do not allow protection of well casing which requires bottom-hole placement. To applicant's knowledge, a safety valve effective for control in such as gas wells having production capacity greater than 25 to 30 million cubic feet per day is not present in the prior art and such devices for reliable application are not available at present.

SUMMARY OF THE INVENTION

The present invention contemplates a safety valve wherein a differential pressure is sensed within a flow conduit, and upon obtaining predetermined differential pressure value, differential pressure actuated valve closure mechanism is activated to stop fluid flow until corrective measures can be taken. The structure consists of a two-stage piston responsive to differential pressure of predetermined amount to effect force movement of a sealing assembly which shuts off fluid flow as it is conducted through one end of the safety valve. The sealing assembly is maintained in closed attitude by reduced pressure on the downstream side.

Volumetric consideration of three separate volumes within the valve structure control a time sequence of operational events such that a non-actuating pressure force is temporarily imposed upon the two-stage piston preventing premature closure when pressure within the valve structure lags external system pressure, a condition common during rapid increase or decrease of flow rate, thus a continued flowing pressure differential is required to effect closure. A latch mechanism is provided to hold the sealing assembly in open position thus preventing premature closure when pressure within the valve structure exceeds external system pressure, a condition common during rapid increase of flow rate. The safety valve is operable to prevent excess or uncontrolled flow in a first direction while also allowing flow in the reverse direction as is necessary in the function of underground natural gas storage.

Therefore, it is an object of the present invention to provide a self-contained flow conduit safety valve which is preset for proper operation when placed or secured in a well casing, pipeline or the like.

It is also an object of the present invention to provide a self-contained flow conduit safety valve which requires no maintenance to operate and may be left reliably for an indefinite period.

It is another object of the present invention to provide a self-contained flow conduit safety valve which requires no moving seals and which is not sensitive to friction in operation.

It is also another object of the present invention to provide a self-contained flow conduit safety valve which is sensitive to a predetermined intensity of flowing pressure differential and which is not sensitive to transitory pressures caused by a rapid change of flow rate.

It is yet another object of the present invention to provide a self-contained safety valve for use in well casing which has a fixed weight sensor and requires no spring adjustment or regard for spring constants or for spring fatique.

It is still another object of the present invention to provide a self-contained safety valve for use in well casing which responds to a predetermined intensity of flowing pressure differential and which requires no additional energy for complete actuation to shut off flow.

Finally, it is an object of the present invention to provide a self-contained safety valve for downhole placement in well casing which has the capabilities of providing safety cutoff of gas wells having deliverabilities up to and far exceeding 30 million cubic feet per day.

Other objects and advantages of the invention will be evidenced from the following detailed description when read in conjunction with the accompanying drawings which illustrate the invention.

DETAILED DESCRIPTION OF THE PREFERRED EMBODIMENT

Figure 1:
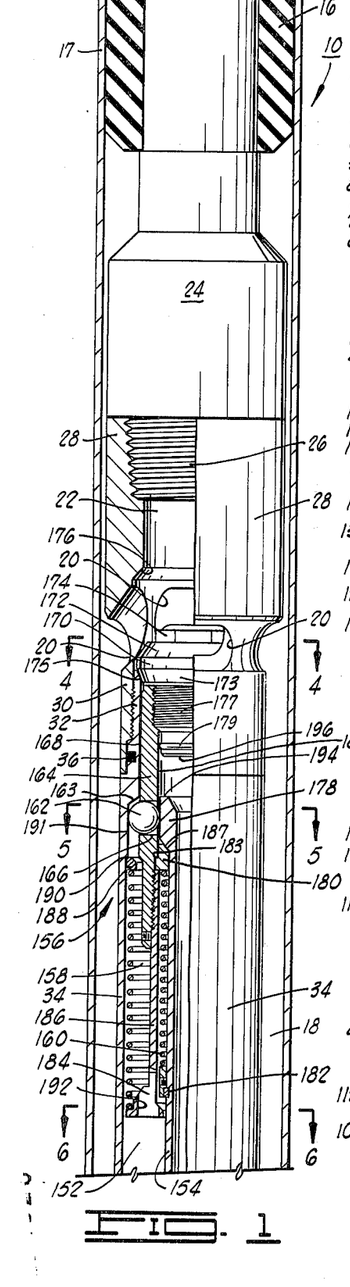
FIG. 1 is a side elevation in partial section of the top portion of the safety valve.
Figure 2:
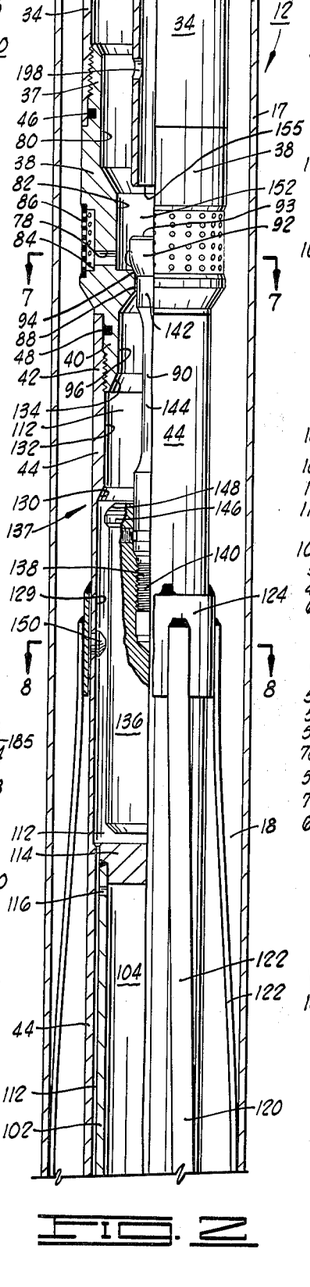
FIG. 2 is a side elevation in partial section of the mid-portion of the safety valve.
Figure 3:
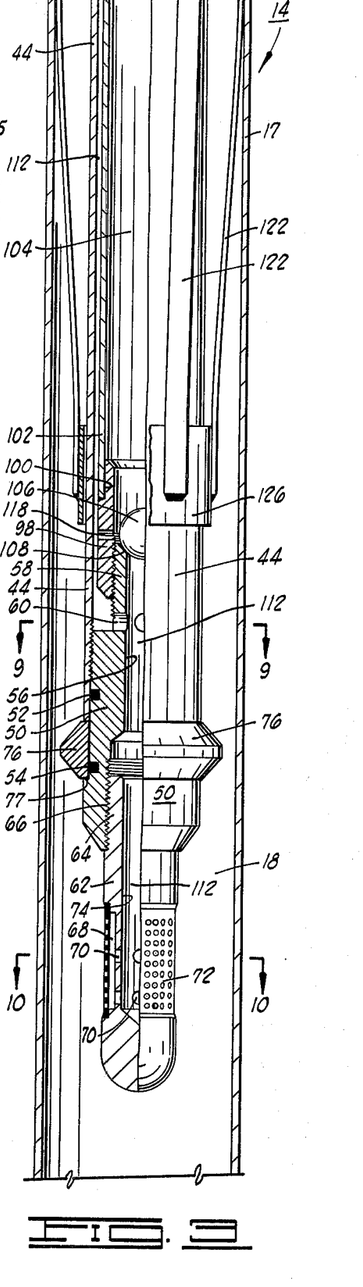
FIG. 3 is a side elevation in partial section of the lower portion of the safety valve.
Figure 4:
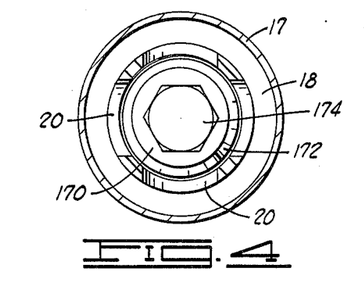
FIG. 4 is a section taken along lines 4—4 of FIG. 1.

FIGS. 1, 2, and 3 show the safety valve as upper section 10, mid-section 12 and lower section 14, respectively. The upper section 10 is depicted as being suspended in a well casing by a conventional form of packer assembly 16, many types of which are commercially available. Flow of fluid is from annulus 18 through each of a plurality of ports 20, and through an interior bore 22 in communication with an internal flow passage (not specifically shown) of packer 16 which is attached to casing 17 leading up to the surface of delivery position. A suitable form of collar joint 24, shown generally, serves to provide flow conductive connection between packer 16 through thread extension 26 which is sealingly inserted within end collar 28 of the safety valve. As shown also in FIG. 4, present design calls for four quadrature arrayed ports 20.

Figure 9:
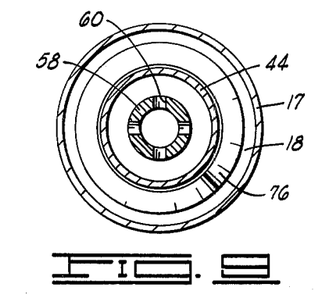
FIG. 9 is a section taken along lines 9—9 of FIG. 3.

Referring again to FIG. 1, the collar 28 is formed unitarily to include the ports 20 and to include a threaded sleeve 30 therebeneath. Threaded sleeve 30 is internally threaded to sealingly receive therein a threaded portion 32 of an upper cylindrical housing 34, and sleeve portion 32 includes a circumferal groove for receiving a sealing ring 36 which insures integrity of connection. The lower end of upper housing 34 (see FIG. 2) sealingly receives a threaded insert end 37 of a middle housing member 38 which terminates at the lower end at a reduced diameter threaded insert 40 for sealing reception within a threaded end 42 of a lower housing 44. Circumferential grooves about upper sleeve portion 37 and lower sleeve portion 40 receive sealing rings 46 and 48, respectively. Referring also to FIG. 3, the lower housing 44 is sealingly terminated through threaded receiving of an insert body 50 having circumferential grooves for receiving sealing rings 52 and 54, and including an axial central bore 56 formed coextensive with a reduced diameter threaded insert 58 having a plurality of flow ports 60 formed therethrough. As shown in FIG. 9, present design calls for formation of four equi-spaced ports 60 although this may be varied as total port area is the primary consideration, as will be further described below.

Figure 10:
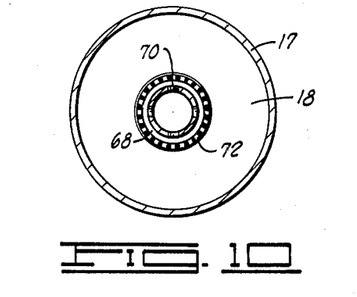
FIG. 10 is a section taken along lines 10—10 of FIG. 3.

A head 62 having threaded end portion 64 is sealingly received within a lower threaded bore 66 of body 50. Head 62 is formed with a circumferential recess 68 having a plurality of pressure sensing ports 70 disposed therearound and the entire recess is covered by perforated metal cover 72 which provides a screening and protective function. As shown in FIG. 10, a plurality of sensing ports 70 are disposed about recess 68 on one or more levels to provide free passage of gas for differential pressure sensing.

Figure 7:
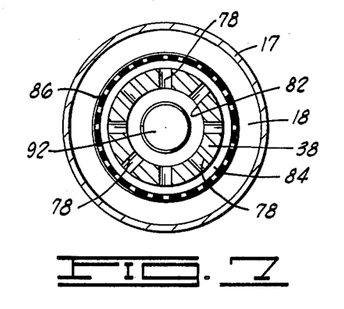
FIG. 7 is a section taken along lines 7—7 of FIG. 2.

As fluid flows through the annulus 18 within casing 17 a differential pressure is established by increased velocity as the fluid passes through the annular orifice formed between casing 17 and baffle 76 which is retained in circumferential position between an annular shoulder 77 of body 50 and a lower edge of lower housing cylinder 44. The outside diameter of baffle 76 is variable in accordance with the desired differential pressure actuation point, casing size, tool size and the like, and serves to increase velocity of the flowing fluid and thereby set up a differential pressure across its transverse plane of location within casing 17. Thus, differential pressure on one side is sensed through foraminous cover 72 and ports 70 while differential pressure on the other side is sensed through ports 78 within middle housing 38 (see FIG. 2). The housing 38 is formed with a first large diameter axial bore 80 which tapers concentrically downward to a second lesser diameter axial bore 82 into which sensing ports 78 communicate. As shown also in FIG. 7, the ports 78 communicate with circumferential recess 84 formed around housing 38. The entire recess 84 is covered by perforated metal cover 86 which provides a screening and protective function.

The lower portion of housing 38 includes a still smaller diameter slide bore 88 which movably retains a differential valve piston 90 as valve head 92 rests in the closed position on chamfered circumferential seat 94 when in the non-actuated position, as will be further described below. The internal bore of housing 38 is tapered outward from slide bore 88 to provide a bore 96 of selective diameter in accordance with volumetric requirements.

Referring again to FIG. 3, a collar member 98 is received in threaded engagement over body portion 58 and is formed with a shoulder recess 100 which is adapted to receive a cylindrical housing 102 in weld affixture. Housing 102 defines a one-way volume chamber 104 which continues downward through the inner circumference of collar 98 to a check ball 106 which rests upon chamfered inner periphery 108 of threaded insert 58. Referring again to FIG. 2, chamber 104 is further defined by weld closure of a cap 114 over the cylindrical sleeve 102, and a upper port 116 and a lower port 118 are provided for pressure equalization and drainage of any accumulated matter.

Centering of the safety valve within casing 17 is assured by the centralization assembly 120 which consists of a plurality of bow spring members 122 maintained longitudinal and equi-spaced by weld connection to a ring member 124 which, in turn, is welded fixed to lower housing 44. The lower ends of bow springs 122 (see FIG. 3) are welded to a ring member 126 which is free to slide along housing 44 in accordance with positioning stresses.

Referring again to FIG. 2, a lower volume chamber 112 is defined below a valve head 92 and extends downward within housing 38 along inner cylindrical slide bore 88 and larger diameter inner cylindrical wall 96 to chamfered annular shoulder 134. The lower volume chamber 112 continues downward within lower housing 44 along inner cylindrical slide bore 132 to chamfered annular shoulder 130 wherein the diameter is increased along inner cylindrical wall 129 to cap 114. The lower volume chamber 112 continues yet further downward to include the annular space between lower housing 44 and sleeve 102 and continues downward through ports 60 of body member 50 (see FIG. 3). Lower volume chamber 112 also includes internal bore 56 of body 50 and internal bore 74 of head 62.

Figure 8:
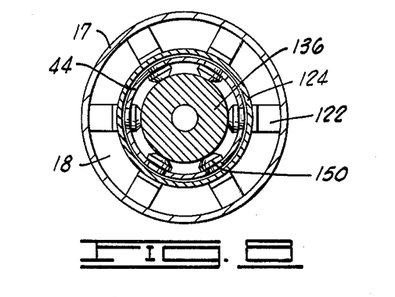
FIG. 8 is a section taken along lines 8—8 of FIG. 2.

Referring again to FIG. 2, a cylindrical weight piston 136 having threaded bore 138 is securely received over threaded end 140 of valve piston 90 and suspended within chamber 112 as valve head 92 rests upon chamfered seating 94 in the normal or non-actuated position. Valve piston 90 and weight piston 136 combine to form a two-stage piston assembly 137 shaped to provide optimum pressure function with head 92 formed to serve as a downward acting weight loaded check valve having a cylindrical first stage piston 142 as well as reduced diameter rod portion 144 therebeneath to separate the function of second stage piston 146 as second stage piston 146 is suspended below slide bore 132 within enlarged bore 129 of housing 44 in the normal or non-actuated position. The upper rim of second stage piston 146 is formed with a chamfered surface 148 around the crown which, in the valve actuated position provides an abutting surface to annular shoulder 134. As shown also in FIG. 8, a plurality of equi-spaced guide buttons 150 are secured to the inner wall of lower housing 44 adjacent weight piston 136 to maintain centralization within chamber 112.

An upper volume chamber 152 is defined above valve head 92 and extends upward within housing 38 along inner cylindrical wall 82 and larger diameter inner cylindrical wall 80 to the upper end of middle housing member 38. The upper volume chamber 152 continues upward within upper housing 34 to an annular shoulder 190 (see FIG. 1) wherein the diameter is reduced along inner cylindrical wall 191 to chamfered annular shoulder 163 and yet further reduced cylindrical slide bore 168 which terminates at the upper end at a chamfered seating surface 175.

Slide bore 168 movably retains a two-way valve assembly 156 as valve head 170 rests in seal position on seat 175 of upper housing 34 when in the valve open position, as will be further described below.

Figure 5:
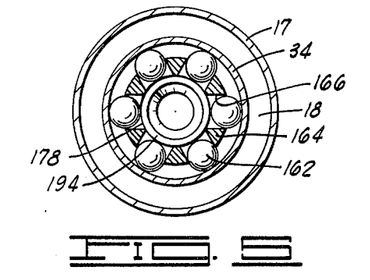
FIG. 5 is a section taken along lines 5—5 of FIG. 1.

Valve head 170 is provided with a hexagonal upper end portion 174 for assembly wrench and is formed with external chamfered rim 172 which, when actuated to its upward position, provides sealing fit against annular shoulder 176 to close off all flow of fluids from annulus 18 upward through collar joint 24 and packer assembly 16. Valve head 170 is further provided with external chamfered rim 173 for sealing fit with annular shoulder 175. Threaded end portion 177 of valve head 170 is sealingly received within an upper threaded bore of collar 164 and end portion 177 includes a circumferal groove for receiving a sealing ring 179 which insures integrity of connection. Collar 164 includes latch ball holes 166. As shown also in FIG. 5, a plurality of equispaced holes 166 are provided to moveably retain latch balls 162 as shown in the latched position thus, upward movement of collar 164 is limited to the clearance between latch balls 162 and shoulder 163.

Figure 6:
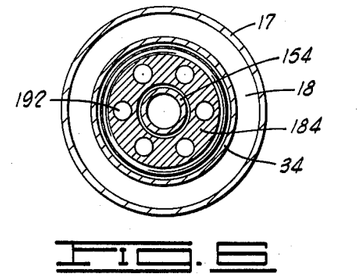
FIG. 6 is a section taken along lines 6—6 of FIG. 1.

An extension sleeve 186 is threaded received in the lower bore of collar 164 and extends downward to a guide collar 184. The outer periphery of guide collar member 184 carries compression spring 158 upward against a stop ring 188 which is held beneath annular shoulder 190. As shown along in FIG. 6, the collar member 184 is formed with a plurality of holes or ports 192 which provide communication and extension of the volume within upper volume chamber 152.

The lower bore of collar 164 extends upward to an annular shoulder 183 wherein the diameter is reduced along inner cylindrical wall 185 which moveably retains the enlarged upper rim 178 of latch sleeve 154. A latch sleeve stop ring 180 is locked between shoulder 183 of collar 164 and the end of extension sleeve 186. The internal bore of latch sleeve stop ring 180 moveably retains latch sleeve 154 as chamfered latch sleeve shoulder 187 rests in the non-actuated position on stop ring 180 and the enlarged upper rim 178 of latch sleeve 154 holds latch balls 162 in latched position. The inner periphery of guide collar member 184 moveably retains the lower section of latch sleeve 154.

A compression spring 160 extends between stop ring 180 and lock ring 182 secured about periphery of latch sleeve 154 a selected distance therebeneath. The lower end of latch sleeve 154 (see FIG. 2) is formed to expose a striking surface 155 which, during actuation, engages striking surface 93 of valve head 92 to initiate release of latch balls 162. The upper end of latch sleeve 154 (see FIG. 1) is formed to expose a striking surface 194 which, during continued actuation, engages striking surface 196 of valve head 170 to initiate movement of the two-way valve assembly into its upward sealing position against annular shoulder 176, as will be further described below. A hole 198 is formed in latch sleeve 154 (see FIG. 2) to equalize pressure when striking surface 93 is in actuating engagement with striking surface 155.

OPERATION

Referring to FIGS. 1, 2 and 3 the safety valve is shown suspended by a packer assembly 16 at a selected position within a well casing 17 for the purpose of preventing excess or uncontrolled flow upward to the location of any casing rupture or equipment failure above packer assembly 16. The safety valve is shown in its open position which enables controlled flow of petroleum liquids, natural gas, or other gaseous products in either direction, i.e., upward from a producing formation or underground storage reservoir or downward for injection in a subterranean reservoir.

Figure 11:
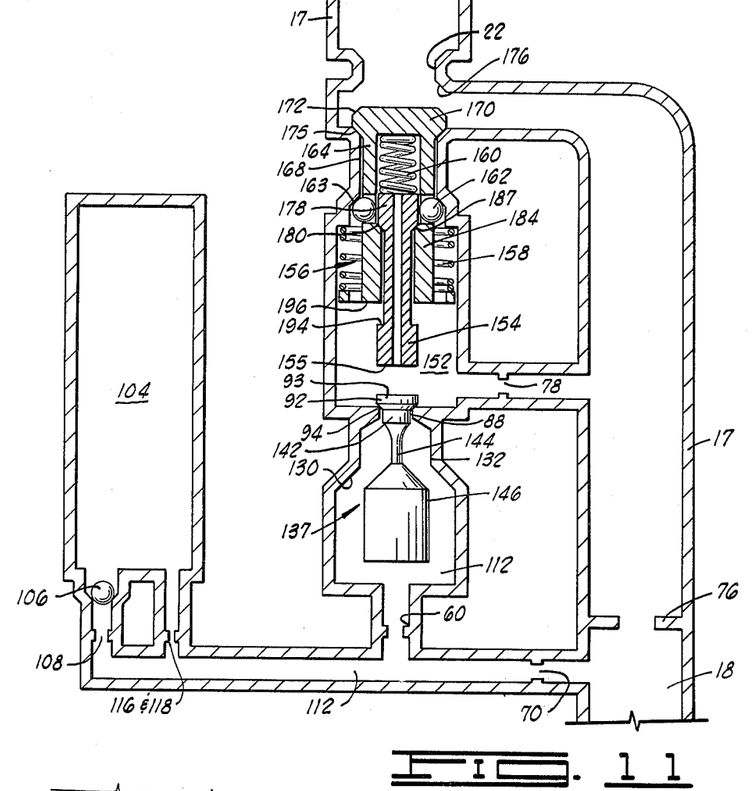
FIG. 11 is a schematic illustration of the safety valve which more clearly illustrates interactive relationships and operation.

Referring also to FIG. 11, the safety valve is shown in schematic form with like parts numbered as in FIGS. 1, 2 and 3. The following flow conditions fully describe all phases of valve operation.

1. Well Shut-In at Surface

When the well is shut-in at the surface and all flow has stopped all external and internal pressures at the safety valve are equalized. The combined weight of two-way valve assembly 156 and the force of spring 158 hold valve head 170 on seat 175 as the combined weight of latch sleeve 154 and the force of spring 160 hold shoulder 187 on stop ring 180 and enlarged upper rim 178 holds latch balls 162 in latched position. The weight of two-stage piston assembly 137 holds valve head 92 on seat 94. The location of ports 78 permit drainage of liquids from upper chamber 152 as the location of ports 116 and 118 permit drainage of liquids from one-way chamber 104 as the location of ports 70 permit drainage of liquids from lower chamber 112.

2. Steady Flow Downward

The pressure at ports 78 is slightly less than the pressure above valve head 170 due to fluid friction thus, a downward pressure force is exerted on valve head 170 as the internal static pressure in chamber 152 is equal to the pressure at ports 78. The pressure at ports 70 is less than the pressure at ports 78 due also, to fluid friction but primarily due to increased fluid velocity past baffle 76 thus, a downward differential pressure force is exerted on valve head 92 as the internal static pressure in chamber 104 and chamber 112 is equal to the pressure at ports 70.

3. Steady Flow Upward

The downward acting pressure forces described above are reversed for steady flow upward. Valve head 170 remains on seat 175 as the combined weight of valve assembly 156 and the force of spring 158 is greater than the upward pressure force on valve assembly 156. Valve head 92 remains on seat 94 as the weight of two-stage piston assembly 137 is greater than the upward differential pressure force on valve head 92.

4. Rapid Pressure Decrease.

When the rate of production from the well is suddenly increased such as opening the wellhead valve after a time of shut-in, the pressure in annulus 18 will drop very rapidly on the order of 500 pounds per minute and it is then necessary to assure reduction of the valve internal pressures without danger of valve actuation. The pressure above valve head 170 will decrease rapidly while the pressure in upper chamber 152 below valve head 170 will decrease more slowly due to restriction of ports 78 resulting in a high upward pressure force on two-way valve assembly 156. Such upward pressure force combined with the normal upward pressure force due to fluid friction exceed the downward weight and spring forces of valve assembly 156, thus valve head 170 moves upward off seat 175 and latch balls 162 abut shoulder 163 preventing valve closure. A highly restrictive passage between slide bore 168 and collar 164 is opened to bleed pressure from chamber 152 while the valve assembly is off seat 175, but it has little effect compared to the larger ports 78.

The pressure within one-way chamber 104 can only bleed out through highly restrictive orifices 116 and 118 as ball check 106 is held closed such that it has little or no effect upon rapidly reducing pressure within lower chamber 112.

Ports 60 and ports 70 each of approximately equal area of ports 78 allow reduction of pressure within lower chamber 112. The volume of upper chamber 152 is larger than the volume of lower chamber 112 thus the pressure in upper chamber 152 above valve head 92 will be always higher than the pressure in lower chamber 112 below valve head 92 as the pressure in both chambers decreases to equilibrium. Such downward pressure difference exerts downward pressure force to hold valve head 92 on seat 94.

5. Rapid Pressure Increase.

When the rate of production from the well is suddenly decreased such as closing the wellhead valve after a time of production, the pressure in annulus 18 will rise very rapidly on the order of 500 pounds per minute and it is then necessary to assure increase of the valve internal pressures without danger of valve actuation. The pressure above valve head 170 will increase rapidly while the pressure in upper chamber 152 below valve head 170 will increase more slowly due to restriction of ports 78 resulting in high downward pressure force on two-way valve assembly 156. Such downward pressure force combined with the downward weight and spring forces of valve assembly 156 hold valve head 170 on seat 175.

Ports 60, ports 70, and check valve seat 108 each of approximately equal area of ports 78 allow increase of pressure within chamber 104 and lower chamber 112. The volume of upper chamber 152 is smaller than the combined volume of lower chamber 112 and chamber 104 thus, the pressure in upper chamber 152 above valve head 92 will be always higher than the pressure in lower chamber 112 below valve head 92 as the pressure in both chambers increases to equilibrium. Such downward pressure difference exerts downward pressure force to hold valve head 92 on seat 94.

6. Excess of Uncontrolled Flow.

In the event of damage to surface control equipment or well casing failure above packer 16 an increased upward flow will increase differential pressure to exceed the predetermined limit and actuate the safety valve to shut off all flow.

If such excess flow occurs suddenly the safety valve will not close immediately. A time delay in the order on one second is necessary for internal valve pressures to reach equilibrium as described above.

When the differential pressure force acting on seat area 94 of valve head 92 increases to equal the weight of two-stage piston assembly 137 the two-stage piston assembly will move upward to lift valve head 92 off seat 94 and gas will begin to flow internally from ports 70 upward through lower chamber 112 and through the restricted annular space between first stage piston 142 and slide bore 88 then out ports 78. Such gas flow serves to concentrically align two-state piston assembly 137 within slide bores 88 and 132 thus eliminating mechanical friction.

A slightly greater differential pressure, the predetermined value, acting on the area of first stage piston 142 then lifts the two-stage piston assembly 137 yet further upward until the second stage piston 146 enters slide bore 132 as the lower end of first stage piston 142 is still within slide bore 88. Two-stage piston assembly 137 continues to lift yet further upward until first stage piston 142 moves above slide bore 88 and the larger annular space between rod 144 and slide bore 88 allows the pressure above second stage piston 146 to equalize with the pressure at ports 78. The differential pressure then acts on the area of second stage piston 146 to exert a net upward force in the order of 100 pounds.

The two-stage piston assembly 137 then moves rapidly upward with net force as striking surface 93 contacts striking surface 155 driving latch sleeve 154 upward against the holding force of compression spring 160 until rim 178 moves upward to allow inward movement of latch balls 162 and freedom for valve assembly 156 to move upward.

The two-stage piston assembly 137 continues to move rapidly upward as striking surface 194 contacts striking surface 196 driving valve assembly 156 upward against the holding force of compression spring 158 until surface 148 abuts shoulder 134 as valve rim 172 nears seat 176. Latch balls 162 are shifted inward by chamfered shoulder 163 as valve assembly 156 moves upward. The force required to compress spring 160 is effective to lift valve assembly 156 as applied to ring 180.

The upward flow through annulus 18 ports 20 and bore 22 then must pass through the restricted opening between valve head 170 and shoulder 176 at high velocity creating a large pressure drop between ports 78 and bore 22. Such difference of pressure exerts a large pressure force acting on the area of collar 164 driving the valve assembly upward into sealing abutment of rim 172 with shoulder 176 wherein all gas flow upward is stopped and the pressure beneath the safety valve rapidly equalizes to the shut-in formation pressure to hold the valve closed. Upon equalization of pressures within the safety valve two-stage piston assembly 137 falls downward to return valve head 92 to seat 94.

7. Opening Safety Valve

Resetting of the safety valve once acutated requires application of pressure from the casing above after repair of surface failures or determination of other problems. Increasing pressure within the upper well casing 17 to a value equal to or slightly less than the pressure in annulus 18 below the valve will then allow spring 158 to return valve head 170 to seat 175 wherein spring 160 carries latch sleeve 154 downward as chamfered shoulder 187 shifts latch balls 162 outward into latched position and upper rim 178 holds latch balls 162 in latched position as shoulder 187 rests on ring shoulder 180.

Figure 12:
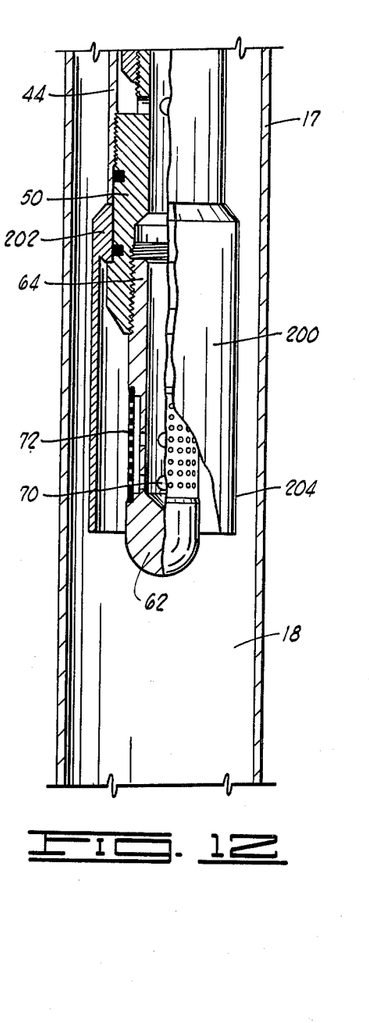
FIG. 12 is a side elevation in partial section of an alternative form of pressure response structure utilized in the lower portion of the safety valve.
Figure 13:
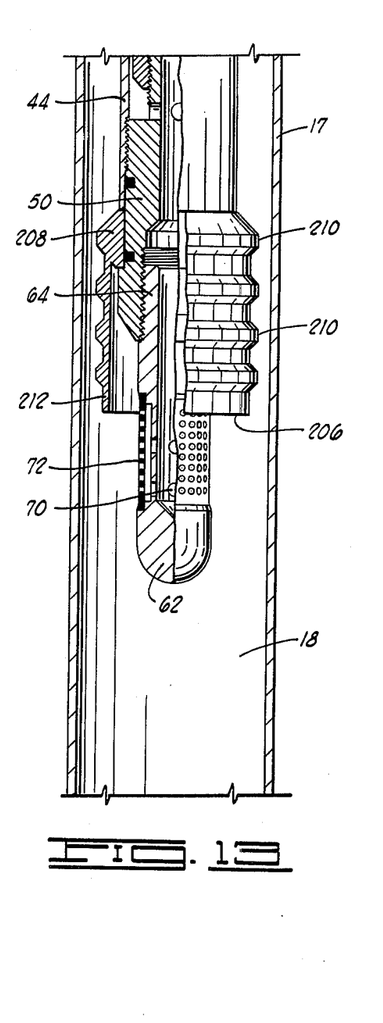
FIG. 13 is a side elevation in partial section of yet another alternative form of pressure response structure utilized in the lower portion of the safety valve.

FIGS. 12 and 13 illustrate alternative forms of structure which may be employed instead of baffle 76 to establish differential pressure (FIG. 3). FIG. 12 illustrates an impact pressure device or cup 200 having an internal annular formation 202 adapted to be rigidly secured between insert body 50 and lower housing 44 in the same manner as baffle 76 (FIG 3). A cylindrical sleeve portion 204 extends concentrically downward to terminate below the lower pressure sensing ports 70 such that fluids rushing upward within annulus 18 will provide an impact pressure indication rather than a side static pressure differential as sensed in the preferred emodiment. Adjustment of the diameter of sleeve member 204 may be made to provide the proper range of impact pressures to enable proper valve actuation and operation FIG. 13 illustrates yet another alternative wherein a series baffle 206 is utilized. The series baffle 206 includes an annular formation 208 to be secured around insert body 50, and a plurality of spaced baffle formations 210 are formed unitarily on a cylindrical sleeve 212 which terminates above the lower sensing ports 70. The function of the series baffle 206 is essentially the same as that for baffle 76 (FIG. 3) as it still causes differential pressure indication through control of the annulus restriction thereacross.

Figure 14:
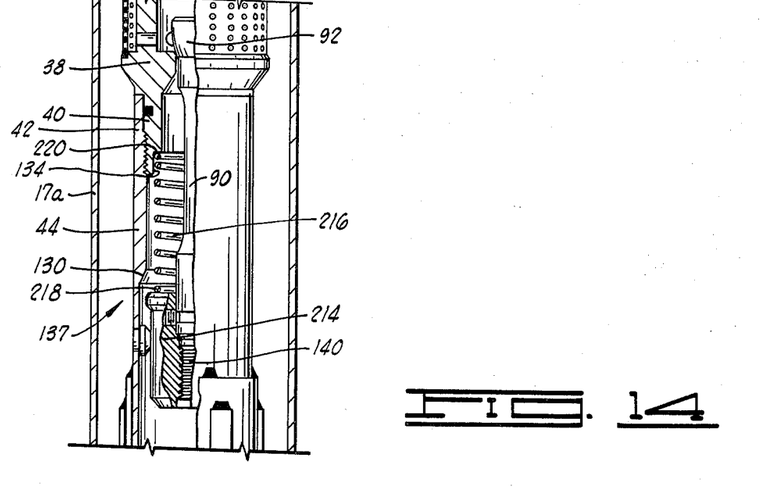
FIG. 14 is an elevation in partial section of a midportion of the safety valve illustrating a horizontal control differential valve.

It is also contemplated that a safety valve of the type disclosed herein may be used to good advantage for excess flow cutoff in pipelines or other horizontal disposed casing members. Thus, as shown in FIG. 14, it would be necessary to alter certain design characteristics of those components requiring gravity positioning. The two-stage valve assembly 137 would require a different form of weight piston 214 similarly affixed thereto but of less weight. A compression spring 216 is disposed between a counter bore 218 in weight piston 214 and a bore 220 in shoulder 134 to provide repositioning force to valve piston 90. All other components of the safety valve remain the same with the exception that check ball 106 would be replaced by a spring loaded check device of well-known type.

The foregoing discloses a novel form of fluid safety valve which is capable of maintaining control of flow pressure reduction and increase while still having the capability of positive flow shut off in the event that dangerous high differential pressures are sensed at its location in a well casing, pipeline or the like. After repair or correction of those factors contributing to such dangerous pressure levels it is only necessary to repressure the casing from above to completely reset the safety valve and once again commence operation. No wire lines, fishing tools, or other remote control devices are required in operating and maintaining the safety valve.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A self-contained safety valve for prevention of excess or uncontrolled fluid flow in a conduit, comprising:
    means for securing said safety valve in the conduit which includes port means directing flow of fluid therethrough;
    baffle means affixed transversely within said conduit to produce pressure differential by increased fluid velocity thereacross;
    first chamber means including a piston consisting of a sealing cap and axial extension member slidably disposed through one end, and including a sensing port communicating with the conduit on first side of said baffle means;
    second chamber means disposed adjacent said first chamber means and having a valve seat opening communicating therewith and a sensing port communicating with the conduit on the second side of said baffle means; and
    valve piston means seated in said valve seat opening and biased toward said second chamber means such that presence of greater than predetermined differential pressure sensed on the second side relative to the first side of the baffle means moves the valve piston means into engagement with the piston axial extension member to position the piston sealing cap in said port means thereby ceasing fluid flow.

2. A safety valve as set forth in claim 1 which is further characterized to include:
    third chamber means having a bleed hole and a port both communicating with said second chamber means.

3. A safety valve as set forth in claim 2 which is further characterized to include:
    check valve means in said third chamber port, said check valve being biased closed toward said second chamber means.

4. A safety valve as set forth in claim 2 wherein:
    the combined volume of said third chamber means and said second chamber means acting together is larger than the volume of said first chamber means which is larger in volume than said second chamber means.

5. A safety valve as set forth in claim 1 which is further characterized to include:
    latching means actuated by initial movement of said piston axial extension member to release and allow completion of movement of the extension member to close said port means.

6. A safety valve as set forth in claim 1 which is further characterized to include:
    spring means disposed around said axial extension member and biasing movement of said axial extension member into said first chamber means.

7. A safety valve as set forth in claim 5 which is further characterized to include:
    spring means disposed around said axial extension member and biasing movement of said axial extension member into said first chamber means.

8. A safety valve as set forth in claim 1 wherein:
    said valve piston means in biased closed by means of a weight member affixed thereto and disposed within said second chamber means.

9. A safety valve as set forth in claim 1 wherein:

said valve piston means is biased closed by means of a compression spring disposed around said valve piston means and seated within said second chamber means.

10. A safety valve as set forth in claim 1 which is further characterized in that:
said second chamber means is cylindrical having a first inner wall adjacent said valve seat opening and said first inner wall extends through an annular shoulder to a larger diameter second inner wall; and
said valve piston means is formed to include a cylindrical weight of complementary diameter to said first inner wall and normally disposed below said annular shoulder such that initial movement of said valve piston means to open said valve seat opening enables a secondary restriction between said annular shoulder and cylindrical weight to increase force of movement of said valve piston means.

* * * * *